United States Patent
Nakayama

(10) Patent No.: US 12,408,244 B2
(45) Date of Patent: Sep. 2, 2025

(54) LIGHT-EMITTING ELEMENT DRIVING CIRCUIT

(71) Applicant: ROHM CO., LTD., Kyoto (JP)

(72) Inventor: Masaaki Nakayama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 78 days.

(21) Appl. No.: 18/469,880

(22) Filed: Sep. 19, 2023

(65) Prior Publication Data
US 2024/0015864 A1    Jan. 11, 2024

Related U.S. Application Data

(63) Continuation of application No. PCT/JP2022/009095, filed on Mar. 3, 2022.

(30) Foreign Application Priority Data

Mar. 24, 2021  (JP) .................................. 2021-049795

(51) Int. Cl.
H05B 45/10        (2020.01)
H05B 45/325       (2020.01)

(52) U.S. Cl.
CPC ........... *H05B 45/10* (2020.01); *H05B 45/325* (2020.01)

(58) Field of Classification Search
CPC .... H05B 45/10; H05B 45/325; H05B 45/345; Y02B 20/40
See application file for complete search history.

(56) References Cited

U.S. PATENT DOCUMENTS

| 2017/0086281 A1* | 3/2017 | Avrahamy | H05B 39/086 |
| 2018/0042064 A1* | 2/2018 | Norton | H04W 4/70 |
| 2019/0335551 A1* | 10/2019 | Williams | H05B 45/24 |

FOREIGN PATENT DOCUMENTS

| JP | 2012182010 A * | 9/2012 |
| JP | 2017-028866 | 2/2017 |

OTHER PUBLICATIONS

International Search Report and Written Opinion in International Appln. No. PCT/JP2022/009095, mailed on May 10, 2022, 12 pages (with machine translation).
JP OA—Japanese Patent Office, Office Action in Japanese Appln. No. 2023-508885, dated Jul. 22, 2025, 6 pages (with English translation).

* cited by examiner

*Primary Examiner* — Abdullah A Riyami
*Assistant Examiner* — Syed M Kaiser
(74) *Attorney, Agent, or Firm* — Fish & Richardson P.C.

(57) ABSTRACT

A light-emitting element driving circuit (1) includes: a first buffer (6) provided between the transmission terminal (1B) and the communication circuit (2), with the output side of the first buffer connected to the transmission terminal and the input side of the first buffer connected to the communication circuit; and a determination circuit (32) configured to determine whether the controller (15) is connected or not based on a first signal (S1) at the output terminal of the first buffer and a second signal (S2) at the input terminal of the first buffer. If the determination circuit determines that the controller is not connected, the communication circuit is disabled from processing the signal received via the reception terminal (1A), and the dimming signal generator (31) generates the dimming signal (Spwm) based on a pulse signal (Sp) fed to the reception terminal or the transmission terminal.

9 Claims, 7 Drawing Sheets

LIGHT-EMITTING ELEMENT DRIVING CIRCUIT

CROSS-REFERENCE TO RELATED APPLICATIONS

This nonprovisional application is a continuation application of International Patent Application No. PCT/JP2022/009095 filed on Mar. 3, 2022, which claims priority Japanese Patent Application No. 2021-049795 filed on Mar. 24, 2021, the entire contents of which are hereby incorporated by reference.

TECHNICAL FIELD

The present disclosure relates to a light-emitting element driving circuit.

BACKGROUND ART

Various light-emitting element driving circuits are known for driving light-emitting elements such as LEDs (light emitting diodes).

Conventional LED driving circuits include a current driver for passing a current through an LED. Some conventional LED driving circuits perform PWM (pulse width modulation) control on the current driver based on communication with an external processor (see, for example, Patent Document 1). In PWM control, the current driver is turned on and off based on a PWM signal. This permits PWM dimming of the LED.

CITATION LIST

Patent Literature

Patent Document 1: Japanese Unexamined Patent Application Publication No. 2017-28866

DESCRIPTON OF EMBODIMENTS

1. Comparative Example

Figure 7:
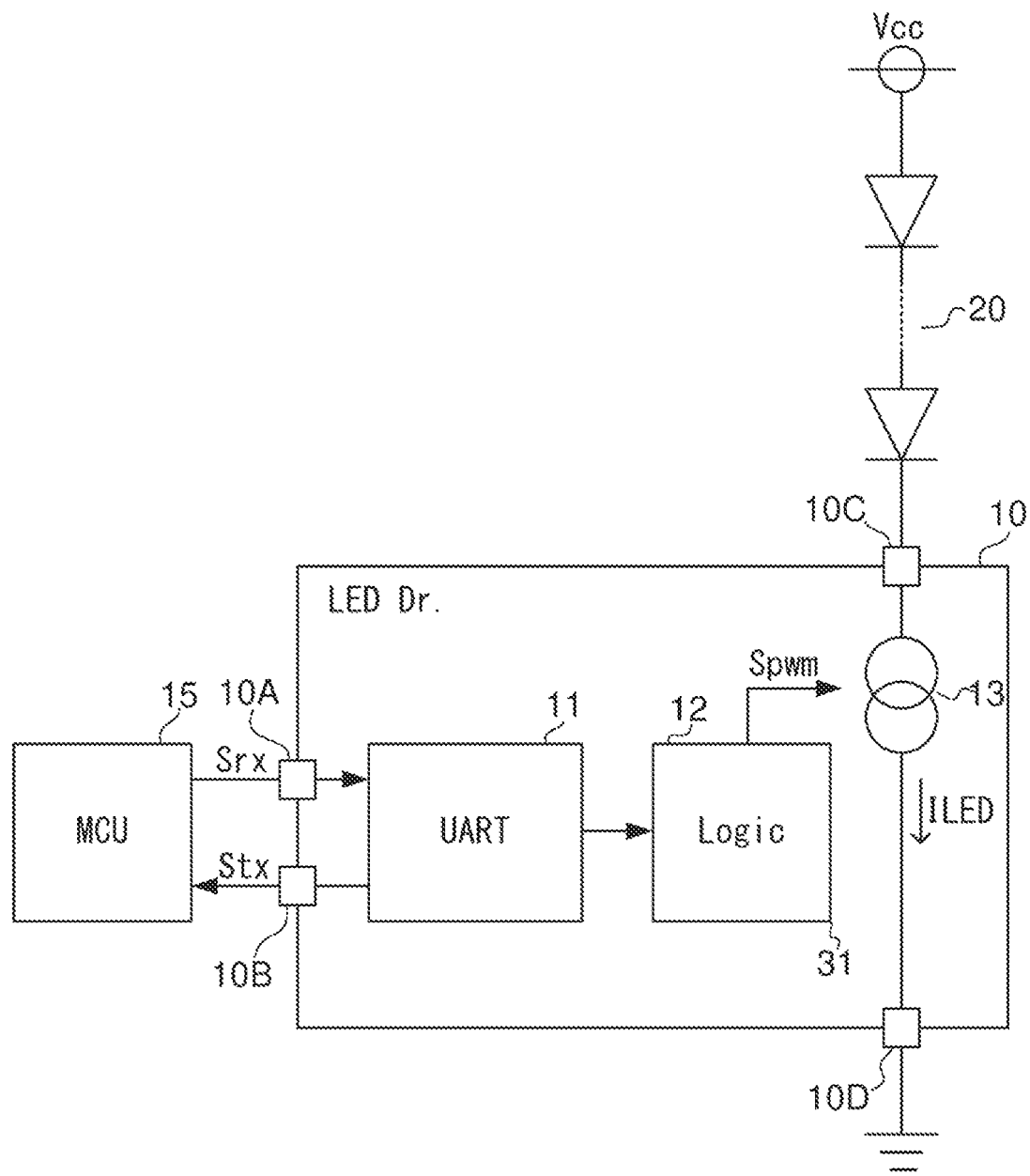
FIG. 7 is a diagram showing the schematic block configuration of an LED driving circuit according to a comparative example.

First, before a description of illustrative embodiments of the present invention, a comparative example will be described. FIG. 7 is a diagram showing the schematic block configuration of an LED driving circuit 10 according to the comparative example. The LED driving circuit 10 shown in FIG. 7 includes a UART 11, a logic circuit 12, and a constant-current circuit 13. The LED driving circuit 10 has an RX terminal 10A, a TX terminal 10B, an LED terminal 10C, and a ground terminal 10D as external terminals for establishing electrical connections with the outside.

The UART (universal asynchronous receiver/transmitter) 11 is a circuit that performs two-way conversion between serial and parallel signals. Outside the LED driving circuit 10, an MCU (microcontroller unit) 15 is provided. The MCU 15 is connectable to the RX and TX terminals 10A and 10B. The UART 11 receives a reception signal Srx from the MCU 15 via the RX terminal 10A. The UART 11 transmits a transmission signal Stx to the MCU 15 via the TX terminal 10B. That is, the UART 11 is a communication circuit configured to be able to communicate with the MCU 15.

The constant-current circuit 13 is a circuit for passing a constant LED current ILED in an LED 20 provided outside the LED driving circuit 10. The anode of the LED 20 is connected to an application terminal for a supply voltage Vcc. The cathode of the LED 20 is connected to the LED terminal 10C. The ground terminal 10D is connected to an application terminal for a ground potential. The constant-current circuit 13 is provided to connect between the LED and ground terminals 10C and 10D. The LED 20 is not limited to a configuration in which a plurality of LED elements are connected in series as shown in FIG. 7, and may be, for example, a single LED element.

The UART 11 processes the reception signal Srx from the MCU 15 and gives a command to the logic circuit 12. The logic circuit 12 receives the command and generates a PWM signal Spwm. The PWM signal Spwm is a pulse signal having levels corresponding to an on period and an off period respectively. The constant-current circuit 13 is turned on and off based on the PWM signal Spwm. When the constant-current circuit 13 is on, the LED current ILED flows, and when the constant-current circuit 13 is off, the LED current ILED does not flow. Thus, according to the on duty of the PWM signal Spwm (that is, the proportion of the on period in the pulse period), PWM dimming of the LED 20 can be performed.

However, with this LED driving circuit 10, if the MCU 15 is not used, communication with the MCU 15 cannot be performed, so light emission control for the LED 20 cannot be performed. That is, the use of the MCU 15 is prerequisite and the LED driving circuit 10 cannot be used stand-alone.

To cope with that, additional terminals may be provided to allow the LED driving circuit 10 to be used stand-alone; however, increasing the number of terminals in the LED driving circuit 10 leads to an increase in the number of terminals in the IC (integrated circuit) package that results from modularizing the LED driving circuit 10, which is undesirable.

2. First Embodiment

<2-1. Configuration of the LED Driving Circuit>

Figure 1:
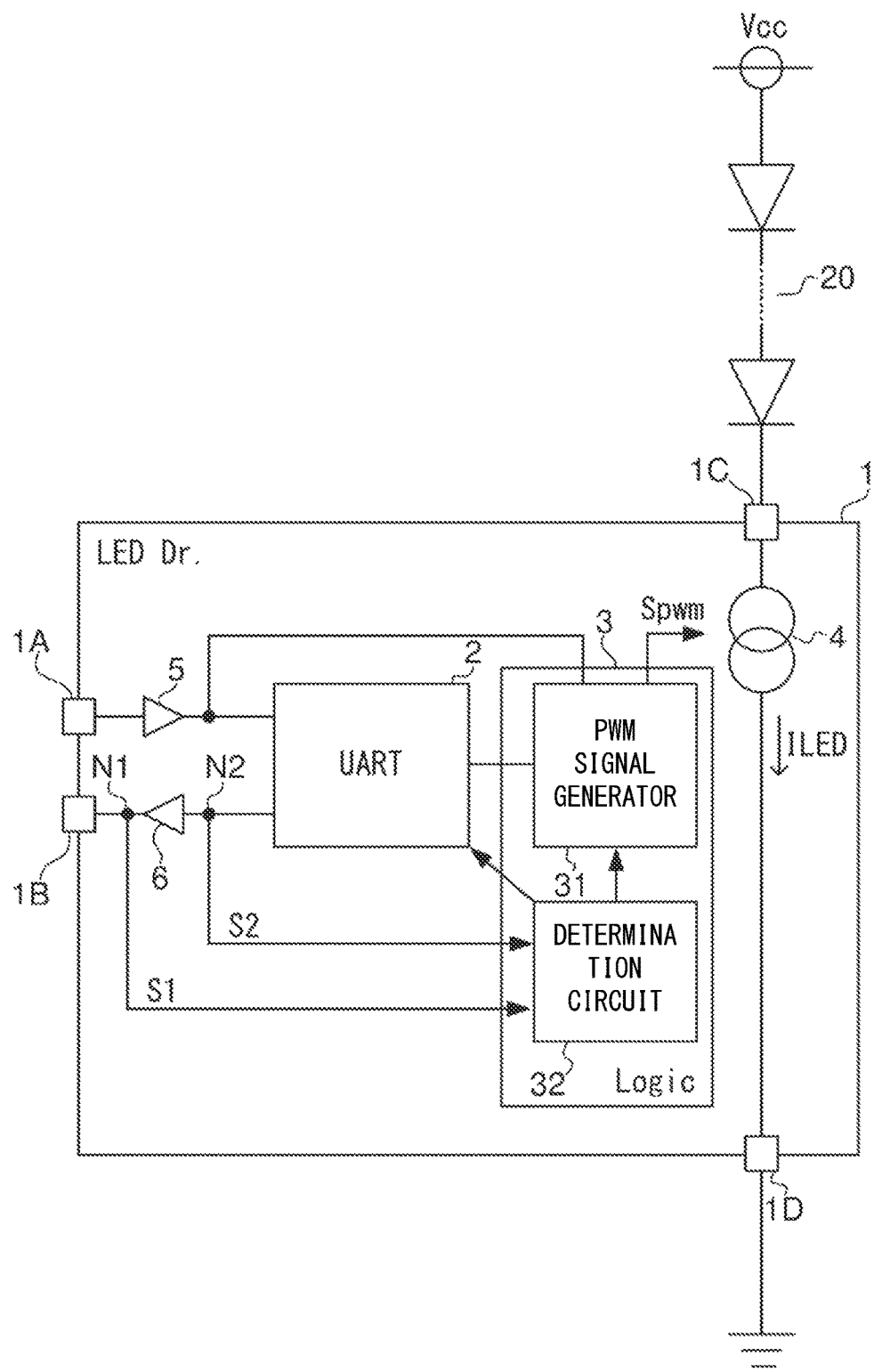
FIG. 1 is a diagram showing the schematic block configuration of an LED driving circuit according to a first embodiment.

Hereinafter, various embodiments devised to solve the above problems will be described. FIG. 1 is a diagram showing the schematic block configuration of an LED driving circuit 1 according to a first embodiment.

The LED driving circuit 1 shown in FIG. 1 includes a UART 2 (communication circuit), a logic circuit 3, a constant-current circuit 4, and buffers 5 and 6. The LED driving circuit 1 has an RX terminal 1A (reception terminal), a TX terminal 1B (transmission terminal), an LED terminal 1C, and a ground terminal 1D for establishing electrical connections with the outside.

The RX and TX terminals 1A and 1B can be connected to an external MCU (controller) not shown in FIG. 1 (see FIG. 2, which will be referred to later). The RX terminal 1A is connected to the UART 2 via the buffer 5. The input side of the buffer 5 is its side connected to the RX terminal 1A and the output side of the buffer 5 is its side connected to the UART 2. The UART 2 can receive a reception signal from the MCU via the RX terminal 1A and the buffer 5.

The TX terminal 1B is connected to the UART 2 via the buffer 6. The input side of the buffer 6 is its side connected to the UART 2 and the output side of the buffer 6 is its side connected to the TX terminal 1B. The UART 2 can transmit a transmission signal to the MCU via the buffer 6 and the TX terminal 1B.

The logic circuit 3 has a PWM signal generator 31 (dimming controller) and a determination circuit 32.

The PWM signal generator 31 is configured to be able to generate a PWM signal Spwm (dimming signal) according to a command from the UART 2. The PWM signal generator 31 is connected to the output terminal of the buffer 5. Thus, in a stand-alone mode, the PWM signal generator 31 generates the PWM signal Spwm based on a signal fed from the buffer 5. The stand-alone mode is a mode in which the LED driving circuit 1 is used without the LED driving circuit 1 being connected to the MCU.

The determination circuit 32 is configured to be able to monitor a first signal S1 at the output terminal of the buffer 6 (the signal at a node N1) and a second signal S2 at the input terminal of the buffer 6 (the signal at a node N2). Based on the first and second signals S1 and S2, the determination circuit 32 determines whether the LED driving circuit 1 is connected to the MCU. If the determination circuit 32 determines that the MCU is unconnected, it shifts the LED driving circuit 1 to the stand-alone mode.

Incidentally, between the node N1 and the determination circuit 32, a buffer may be provided with its input side connected to the node N1 and its output side connected to the determination circuit 32.

The interconnections around the constant-current circuit 4 and the LED 20 are the same as in the comparative example described above. The constant-current circuit 4 is provided to connect between the LED and ground terminals 1C and 1D. The constant-current circuit 4 is turned on and off based on the PWM signal Spwm.

<2-2. Normal Mode>

The operation of the LED driving circuit 1 configured as described above will be described. FIG. 2 is a diagram showing the LED driving circuit 1 used with the MCU 15 connected to the LED driving circuit 1. That is, FIG. 2 is a diagram showing the LED driving circuit 1 used in a normal mode.

Figure 2:
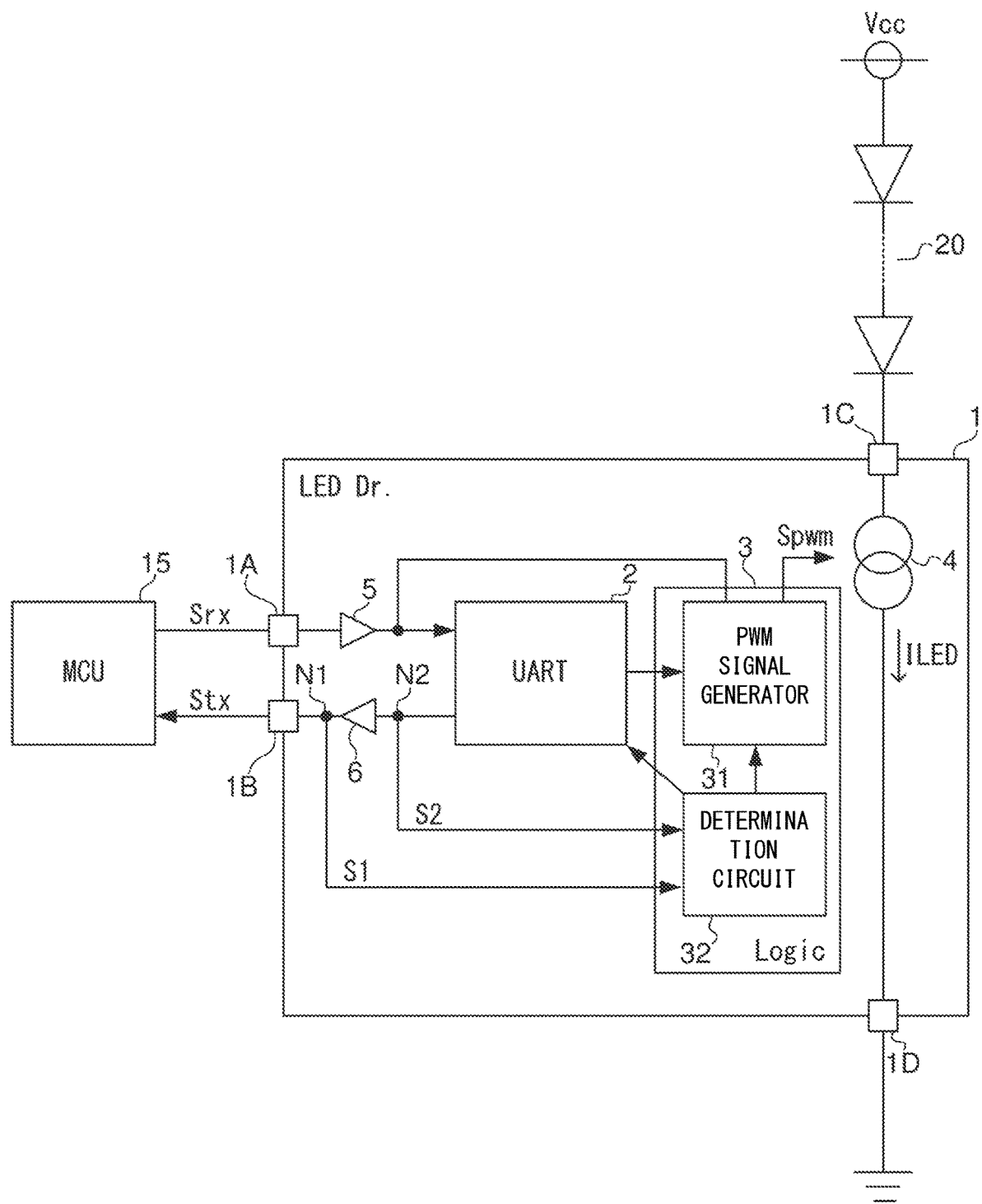
FIG. 2 is a diagram showing the LED driving circuit according to the first embodiment used with an MCU connected to it.

As shown in FIG. 2, owing to the MCU 15 being connected to the RX and TX terminals 1A and 1B, the UART 2 can receive the reception signal Srx from the MCU 15 via the RX terminal 1A and the buffer 5, and can transmit the transmission signal Stx to the MCU 15 via the buffer 6 and the TX terminal 1B.

The reception signal Srx received by the UART 2 from the MCU 15 and the transmission signal Stx transmitted from the UART 2 to the MCU 15 are each a signal that can have either high or low level. Initially, the UART 2 receives the reception signal Srx and then transmits the transmission signal Stx. Meanwhile, the determination circuit 32 monitors the first and second signals S1 and S2, and if it senses that the first signal S1 is at high level when the second signal S2 is being fed from the UART 2, it determines that the MCU 15 is connected to the LED driving circuit 1. As a result, the determination circuit 32 shifts the LED driving circuit 1 to the normal mode.

At that time, the determination circuit 32 enables the UART 2 to process the reception signal Srx. Thus, the UART 2 gives a command to the PWM signal generator 31 based on the processing of the reception signal Srx. In response to the command, the PWM signal generator 31 generates the PWM signal Spwm. The constant-current circuit 4 is turned on and off based on the PWM signal Spwm. Thus, in the normal mode, based on the reception signal Srx from the MCU 15, PWM dimming of the LED 20 is performed.

<2-3. Stand-Alone Mode>

Figure 3:
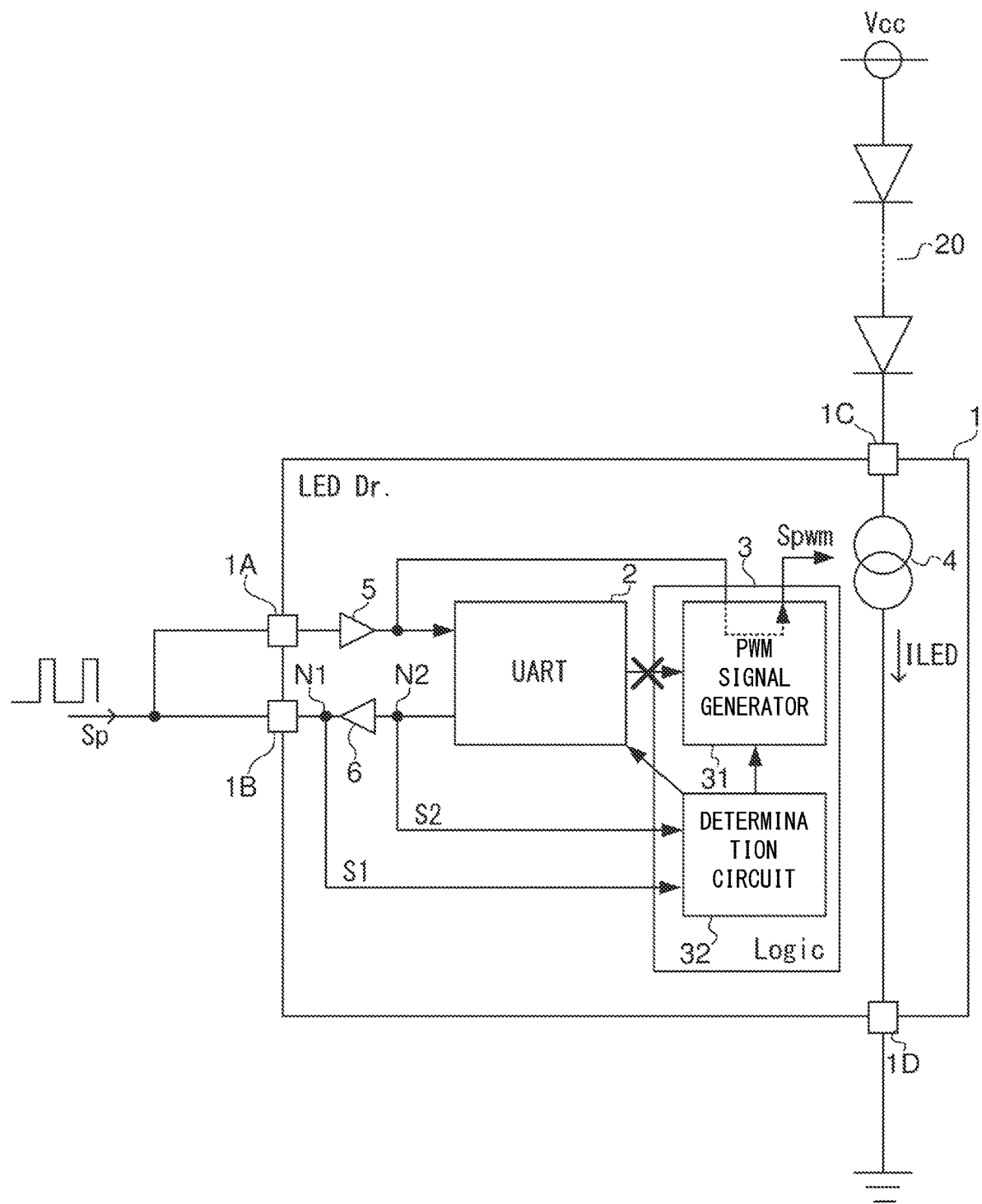
FIG. 3 is a diagram showing the LED driving circuit according to the first embodiment used with no MCU connected to it.

FIG. 3 is a diagram showing the LED driving circuit 1 used without the MCU 15 connected to the LED driving circuit 1. That is, FIG. 3 is a diagram showing the LED driving circuit 1 used in a stand-alone mode.

As shown in FIG. 3, when the LED driving circuit 1 is used in the stand-alone mode, the RX and TX terminals 1A and 1B are short-circuited together outside the LED driving device 1 and the RX and TX terminals 1A and 1B are fed with a pulse signal Sp.

In this case, initially, the determination circuit 32 monitors the first and second signals S1 and S2. The determination signal 32 senses that the first signal S1 is at high level due to the pulse signal Sp when the second signal S2 is not being fed, and determines that the MCU is not connected to the LED driving circuit 1. As a result, the determination circuit 32 shifts the LED driving circuit 1 to the stand-alone mode.

At that time, the determination circuit 32 disables the UART 2 from processing the signal received from the RX terminal 1A (here, the pulse signal Slp). Also, the determination circuit 32 commands the PWM signal generator 31 to operate in the stand-alone mode. In response to the command, the PWM signal generator 31 generates the PWM signal Spwm based on the signal fed from the buffer 5. At this time, the PWM signal Spwm is generated by through processing. That is, the PWM signal Spwm is at high level during the high level period of the pulse signal Sp and is at low level during the low level period of the pulse signal Sp.

The constant-current circuit 4 is turned on and off based on the PWM signal Spwm. Thus, in the stand-alone mode, PWM dimming of the LED 20 is performed based on the pulse signal Sp.

As described above, according to this embodiment, if the MCU 15 is not used, the LED driving circuit 1 can be used with the RX and TX terminals 1A and 1B short-circuited together and fed with the pulse signal Sp, so that it operates stand-alone to perform light emission control for the LED 20. This eliminates the need to add a new terminal in the LED driving circuit 1 and helps avoid an increase in the number of terminals.

3. Second Embodiment

Figure 4:
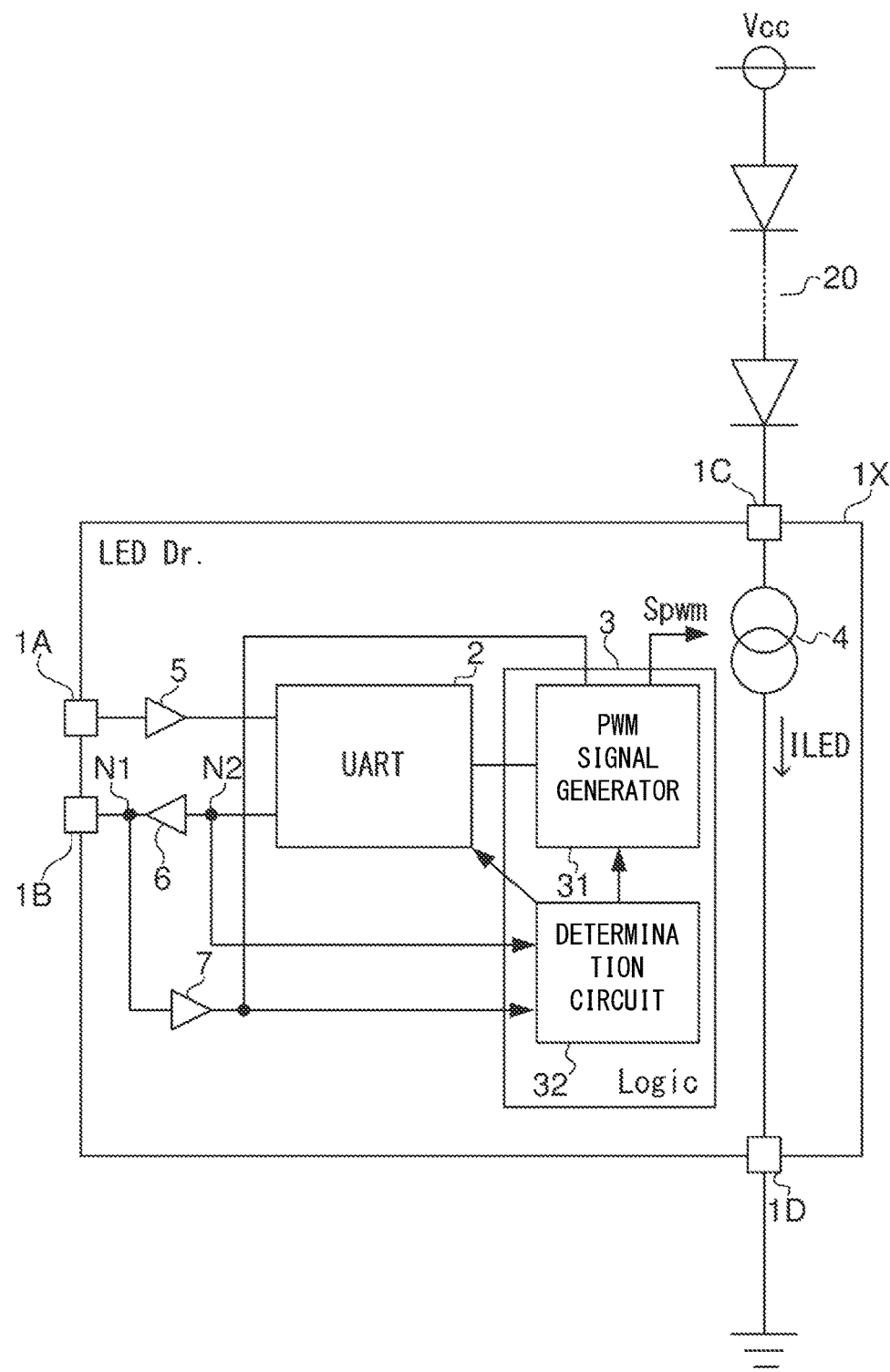
FIG. 4 is a diagram showing the schematic block configuration of an LED driving circuit according to a second embodiment.

FIG. 4 is a diagram showing the schematic block configuration of an LED driving circuit 1X according to a second embodiment. Described below will be differences in configuration of the LED driving circuit 1X shown in FIG. 4 from the first embodiment (see FIG. 1).

The LED driving circuit 1X has a buffer 7. The input terminal of the buffer 7 is connected to a node N1. The output terminal of the buffer 7 is connected to a determination circuit 32. In the LED driving circuit 1X, as opposed to the first embodiment, the PWM signal generator 31 is connected to the output terminal of the buffer 7 instead of to the output terminal of the buffer 5.

Figure 5:
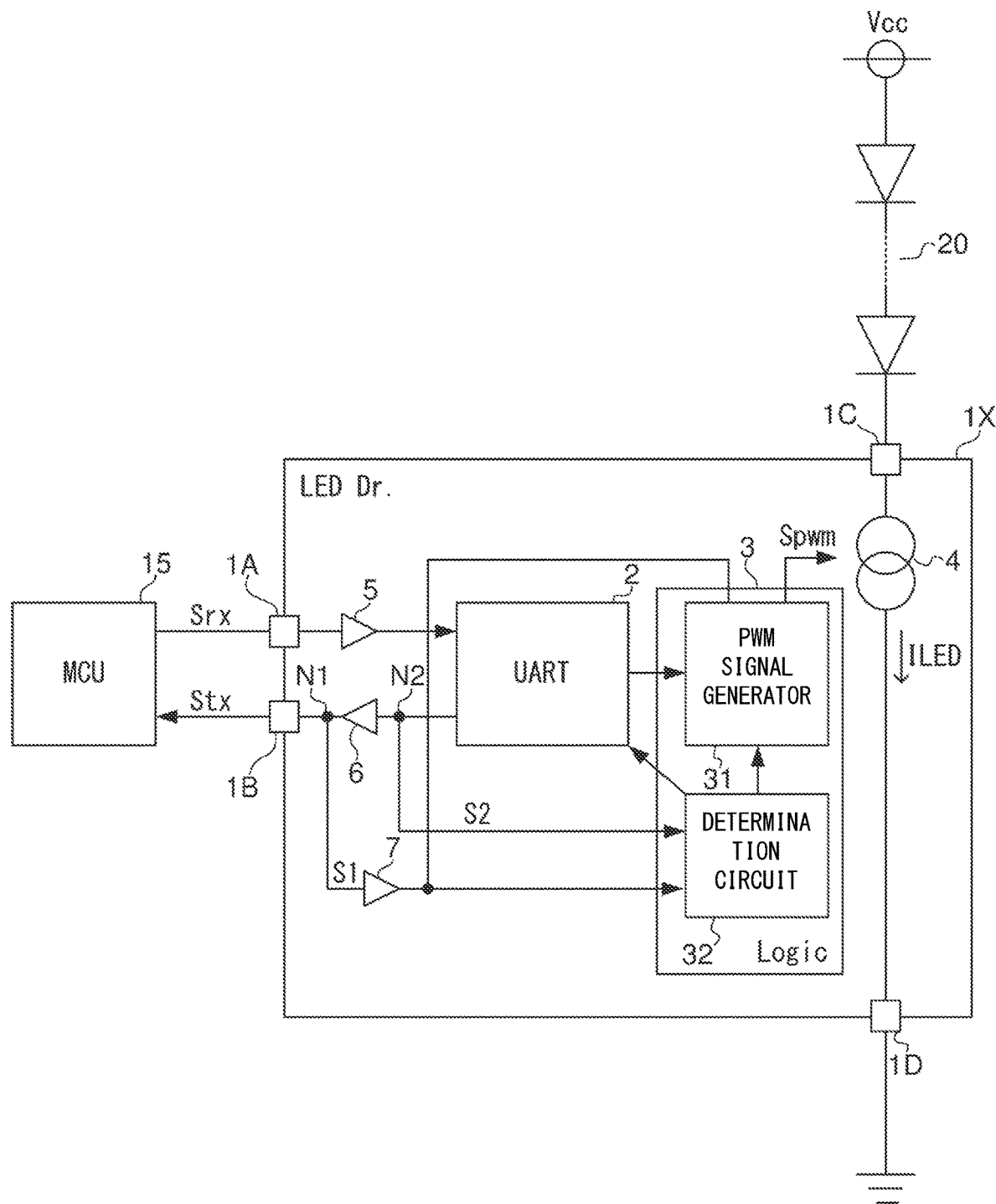
FIG. 5 is a diagram showing the LED driving circuit according to the second embodiment used with an MCU connected to it.

The operation of the LED driving circuit 1X configured as described above will be described. FIG. 5 is a diagram showing the LED driving circuit 1X used with an MCU 15 connected to the LED driving circuit 1X. That is, FIG. 5 is a diagram showing the LED driving circuit 1X used in a normal mode.

Initially, the UART 2 receives a reception signal Srx and then transmits a transmission signal Stx. Meanwhile, the determination circuit 32 monitors a first and second signal S1 and S2. The determination circuit 32 monitors the first signal S1 via the buffer 7. If the determination circuit 32 senses that the first signal S1 is at high level when the second signal S2 is being fed from the UART 2, it determines that the MCU 15 is connected to the LED driving circuit 1X. As a result, the determination circuit 32 shifts the LED driving circuit 1X to the normal mode. The subsequent operation is similar to that in the first embodiment. Thus, the LED driving circuit 1X can operate in the normal mode while being connected to the MCU 15.

Figure 6:
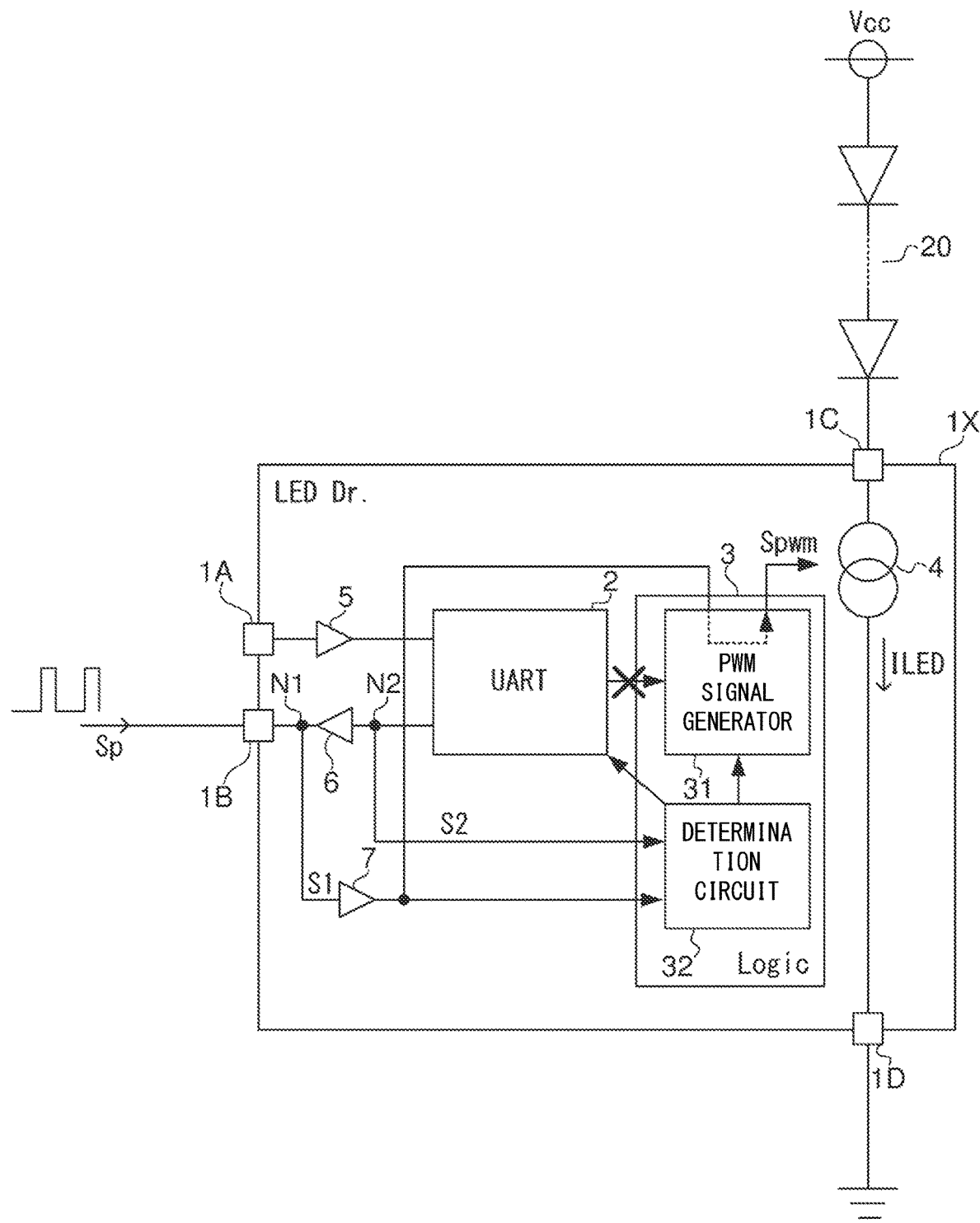
FIG. 6 is a diagram showing the LED driving circuit according to the second embodiment used with no MCU connected to it.

FIG. 6 is a diagram showing the LED driving circuit 1X used without the MCU 15 connected to the LED driving circuit 1X. That is, FIG. 6 is a diagram showing the LED driving circuit 1X used in a stand-alone mode.

As shown in FIG. 6, if the MCU 15 is not connected, an RX terminal 1A is open and a TX terminal 1B is fed with a pulse signal Sp from the outside. Initially the determination circuit 32 monitors the first and second signals S1 and S2. The determination signal 32 senses that the first signal S1 is at high level due to the pulse signal Sp when the second signal S2 is not being fed, and determines that the MCU is not connected to the LED driving circuit 1X. As a result, the determination circuit 32 shifts the LED driving circuit 1X to the stand-alone mode.

At that time, the determination circuit 32 disables the UART 2 from processing the signal received from the RX terminal 1A. Also, the determination circuit 32 commands the PWM signal generator 31 to operate in the stand-alone mode. In response to the command, the PWM signal generator 31 generates the PWM signal Spwm based on the pulse signal Sp fed via the TX terminal 1B and the buffer 7. At this time, the PWM signal Spwm is generated by through processing as in the first embodiment.

Thus, the LED driving circuit 1X according to this embodiment, like that of the first embodiment, can operate in the strand-alone mode to perform light emission control for the LED 20. Also, as in the first embodiment, no additional terminals are required.

Here, using a buffer 7 with fast response makes it possible to transmit the pulse signal Sp to the PWM signal generator 31 with good response and to improve the characteristics of an LED current ILED. However, considering that the buffer 5 used in the normal mode (see FIG. 5) also needs to have fast response, in the first embodiment (see FIG. 1), a fast-response buffer used for generating the PWM signal Spwm can be shared as the buffer 5 in the normal mode and the stand-alone mode.

4. IC Package

The LED 20 and the LED driving circuit 1 (or 1X) are, for example, built into one package. In that case, the IC package is configured with an IC chip having the LED 20 integrated in it and an IC chip having the LED driving circuit 1 (or 1X) integrated in it that are sealed in with a sealing material (resin or the like). The IC package also has terminals (lead frames) for establishing electrical connection with the outside. The IC chip having the LED 20 integrated in it, the IC chip having the LED driving circuit 1 (or 1X) integrated in it, and the terminals are interconnected by bonding wires or the like.

As described above, the LED driving circuit 1 (or 1X) does not require additional terminals. Thus, for an IC package configured as described above, with which it is difficult to increase the number of terminals because of the standard, the LED driving circuit 1 (or 1X) is particularly effective.

The LED and the LED driving circuit may be built into different packages.

5. Other Modifications

While illustrative embodiments have been described above, those embodiments allow for various modifications made without departure from the technical scope of the present invention.

For example, the communication circuit provided in the LED driving circuit for communication with the MCU is not limited to a UART, but may be one that performs communication complying with SPI (serial peripheral interface) or I2C (inter-integrated circuit).

6. Notes

As described above, for example, according to one aspect of the present disclosure, a light-emitting element driving circuit (1) includes:
  a reception terminal (1A) and a transmission terminal (1B) connectable to an external controller (15);
  a communication circuit (2) configured to
    receive a reception signal from the controller via the reception terminal and
    transmit a transmission signal to the controller via the transmission terminal;
  a dimming signal generator (31) configured to generate a dimming signal (Spwm);
  a constant-current circuit (4) configured to
    pass a current in a light-emitting element (20) and
    is turned on and off based on the dimming signal;
  a first buffer (6) provided between the transmission terminal and the communication circuit, with the output side of the first buffer connected to the transmission terminal and the input side of the first buffer connected to the communication circuit; and
  a determination circuit (32) configured to determine whether the controller is connected or not based on a first signal (S1) at the output terminal of the first buffer and a second signal (S2) at the input terminal of the first buffer,
  wherein
  if the determination circuit determines that the controller is connected, the communication circuit is enabled to process a signal received via the reception terminal, and the dimming signal generator generates the dimming signal based on a command from the communication circuit, and
  if the determination circuit determines that the controller is not connected, the communication circuit is disabled from processing the signal received via the reception terminal, and the dimming signal generator generates the dimming signal based on a pulse signal (Sp) fed to the reception terminal or the transmission terminal. (A first configuration.)

In the light-emitting element driving circuit of the first configuration described above, there may be further provided a second buffer (5) between the reception terminal and the communication circuit, with the input side of the second buffer connected to the reception terminal and the output side of the second buffer connected to the communication circuit. The output terminal of the second buffer may be connected to the dimming signal generator, and if the controller is not used, the reception and transmission terminals may be short-circuited together. (A second configuration.)

In the light-emitting element driving circuit of the second configuration described above, there may be further provided a third buffer between a node (N1) to which the transmission terminal and the output terminal of the first buffer are connected and the determination circuit, with the input side of the third buffer connected to the node and the output side of the third buffer connected to the determination circuit. (A third configuration.)

In the light-emitting element driving circuit of the first configuration described above, there may be further provided a fourth buffer (7) between a node (N1) to which the transmission terminal and the output terminal of the first buffer are connected and the determination circuit, with the input side of the fourth buffer connected to the node and the output side of the fourth buffer connected to the determination circuit. The output terminal of the fourth buffer may be connected to the dimming signal generator. (A fourth configuration.)

In the light-emitting element driving circuit of any one of the first to fourth configuration described above, the dimming signal may be a PWM signal. (A fifth configuration.)

In the light-emitting element driving circuit of any one of the first to fifth configuration described above, the communication circuit may be a UART (universal asynchronous receiver/transmitter). (A sixth configuration.)

In the light-emitting element driving circuit of any one of the first to sixth configuration described above, the controller may be an MCU (microcontroller unit). (A seventh configuration.)

In the light-emitting element driving circuit of any one of the first to seventh configuration described above, the light-emitting element may be an LED (light-emitting diode). (An eighth configuration.)

According to another aspect of what is disclosed herein, an IC package includes the light-emitting element driving circuit according to the eighth configuration described above and the LED are built into one package.

INDUSTRIAL APPLICABILITY

The invention disclosed herein finds applications in, for example, LED driving circuits for various uses.

REFERENCE SIGNS LIST 1, 1X LED driving circuit
1A RX terminal
1B TX terminal
1C LED terminal
1D ground terminal
2 UART
3 logic circuit
4 constant-current circuit
5, 6, 7 buffer
10 LED driving circuit
10A RX terminal
10B TX terminal
10C LED terminal
10D ground terminal
11 UART
12 logic circuit
13 constant-current circuit
20 LED
31 PWM signal generator
32 determination circuit

The invention claimed is:

1. A light-emitting element driving circuit comprising:
a reception terminal and a transmission terminal connectable to an external controller;
a communication circuit configured to
receive a reception signal from the controller via the reception terminal and
transmit a transmission signal to the controller via the transmission terminal;
a dimming signal generator configured to generate a dimming signal;
a constant-current circuit configured to
pass a current in a light-emitting element and
be turned on and off based on the dimming signal;
a first buffer provided between the transmission terminal and the communication circuit, with an output side of the first buffer connected to the transmission terminal and an input side of the first buffer connected to the communication circuit; and
a determination circuit configured to determine whether the controller is connected or not based on a first signal at the output terminal of the first buffer and a second signal at the input terminal of the first buffer,
wherein
if the determination circuit determines that the controller is connected, the communication circuit is enabled to process a signal received via the reception terminal, and the dimming signal generator generates the dimming signal based on a command from the communication circuit, and
if the determination circuit determines that the controller is not connected, the communication circuit is disabled from processing the signal received via the reception terminal, and the dimming signal generator generates the dimming signal based on a pulse signal fed to the reception terminal or the transmission terminal.

2. The light-emitting element driving circuit according to claim 1, further comprising:
a second buffer provided between the reception terminal and the communication circuit, with an input side of the second buffer connected to the reception terminal and an output side of the second buffer connected to the communication circuit,
wherein
the output terminal of the second buffer is connected to the dimming signal generator, and
if the controller is not used, the reception and transmission terminals are short-circuited together.

3. The light-emitting element driving circuit according to claim 2, further comprising:
a third buffer provided between a node to which the transmission terminal and the output terminal of the first buffer are connected and the determination circuit, with an input side of the third buffer connected to the node and an output side of the third buffer connected to the determination circuit.

4. The light-emitting element driving circuit according to claim 1, further comprising:
a fourth buffer provided between a node to which the transmission terminal and the output terminal of the first buffer are connected and the determination circuit, with an input side of the fourth buffer connected to the node and an output side of the fourth buffer connected to the determination circuit,
wherein
the output terminal of the fourth buffer is connected to the dimming signal generator.

5. The light-emitting element driving circuit according to claim 1, wherein the dimming signal is a PWM signal.

6. The light-emitting element driving circuit according to claim 1, wherein the communication circuit is a UART (universal asynchronous receiver/transmitter).

7. The light-emitting element driving circuit according to claim 1, wherein the controller is an MCU (microcontroller unit).

8. The light-emitting element driving circuit according to claim 1, wherein the light-emitting element is an LED (light-emitting diode).

9. An IC package having the light-emitting element driving circuit according to claim 8 and the LED built into one package.

* * * * *